June 25, 1940.   J. F. COCHRAN   2,205,684
FAUCET
Filed April 28, 1938   2 Sheets-Sheet 1

Inventor
James Frederick Cochran

By Howard Fischer
Attorney

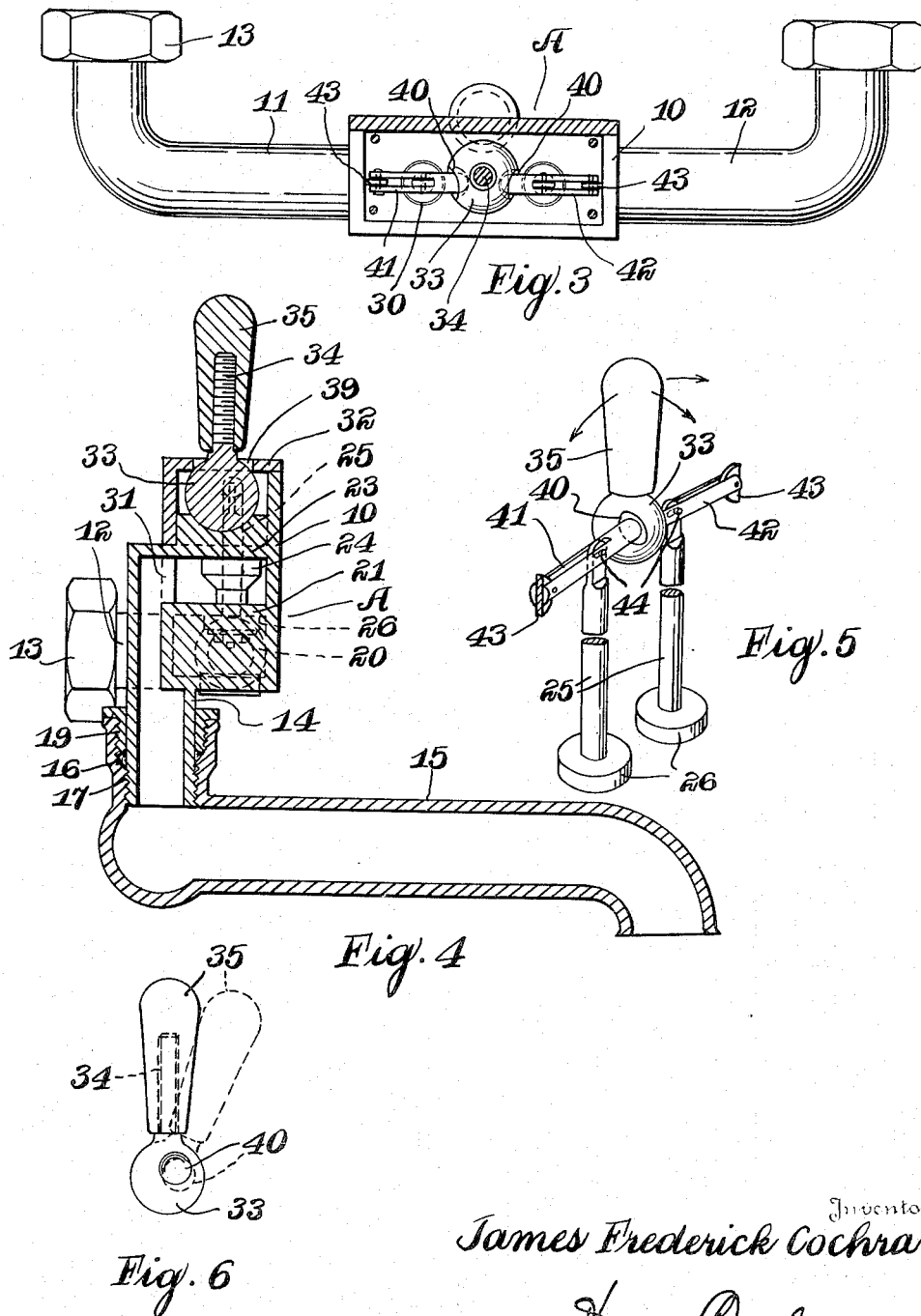

Patented June 25, 1940

2,205,684

UNITED STATES PATENT OFFICE 2,205,684

FAUCET

James Frederick Cochran, Glendale, Calif.

Application April 28, 1938, Serial No. 204,816

10 Claims. (Cl. 277—18)

My invention relates to an improvement in mixing valves wherein it is desired to provide a valve suitable for use in mixing liquids in desired proportions.

Various types of mixing valves have been previously constructed. Some of these valves have been commonly used for the control of hot and cold water supplies and in mixing hot and cold water in desired proportions. Most of these valves, however, with which I am familiar embodied a single valve member which regulated both the supply of hot and the supply of cold water so that the proportion of hot water to the cold water could be regulated, but the amount of the flow could not well be regulated. All of the mixing valves of prior types with which I am familiar always regulated the hot and cold water in unison by simultaneously admitting additional hot water while decreasing the supply of cold water. This construction has had the obvious disadvantage of providing no control for the amount of water flowing through the valve.

It is a purpose of the present invention to provide a valve which is capable of producing a flow of hot water, a flow of cold water, and a means of mixing the hot and cold water in any desired proportion. This means is controlled by a single operating handle which may be easily controlled with one hand.

It is a feature of my invention to provide a valve capable of controlling the volume of a plurality of liquids, such as a supply of hot and cold water, and to regulate the amount of each of these liquids flowing through the valve as well as the proportion of the two liquids. Thus my valve may be controlled to provide a fast flow of hot water, a slow flow of cold water, or any desired regulation in the amount and proportion of the two liquids.

It is a feature of my invention to provide a control embodying a pair of valves each of which controls the flow of one type of liquid through the valve and to provide a single operating handle which may be actuated to open or close either valve singly or may be actuated to open or close the valves in unison. This single operating handle may also open both valves in desired proportion, opening one valve to a greater extent than the other.

It is a purpose of my invention to provide a mixing valve operable by a single control lever which is universally mounted, and which may be pivoted in one plane to operate the valves in unison and may be operated in an entirely different plane to actuate the valves singly. By this means I am able to provide a complete control for a plurality of streams of liquid flowing through the valve in a simple effective manner. It is also a feature that my valve may be manufactured at a low cost because of the simplicity of design.

These and other objects and novel features of my invention will be more clearly and fully set forth in the following specification and claims.

In the drawings forming a part of my specification:

Figure 3 is a sectional view of my valve immediately beneath the cover thereof, the section being indicated by the line 3—3 of Figure 1.

Figure 4 is a sectional view through my valve centrally, the position of the section being indicated by the line 4—4 of Figure 1.

Figure 5 is a diagrammatic perspective view illustrating the manner in which the valves are operated by the control handle.

Figure 6 is a diagrammatic view of the operating or control handle illustrating the manner in which the valves are operated by movement thereof.

Figure 2:
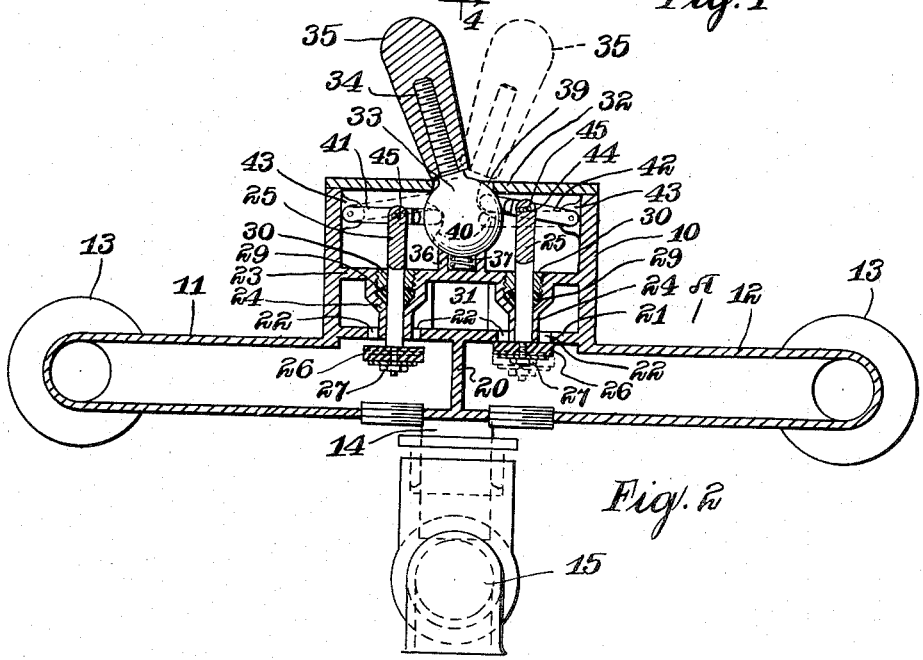
Figure 2 is a similar section to that indicated in Figure 1 illustrating the valves in a different position of operation.

The valve A in the form illustrated comprises a valve casing 10 having inlet pipes 11 and 12 extending thereto. These pipes 11 and 12 are connected by couplings 13 to a suitable source of supply of liquids. The pipe 11, for example, may be connected to the hot water, while the pipe 12 may be connected to a suitable source of supply of cold water. An outlet pipe 14 which may extend in any desired direction, is provided upon the casing 10. In Figures 2 and 4 of the drawings, a swing spout 15 is shown swingably connected to the pipe 14 and a packing gland 16 may be interposed between the internally threaded sleeve portion 17 and a packing nut 19. The nut 19 holds the packing 16 in place while the internal threads on the sleeve portion 17 engage cooperating threads on the pipe 14, and the spout 15 rotates upon these threads.

The inlet pipes 11 and 12 extend into the casing 10 near the bottom thereof and are separated one from the other by a dividing wall 20. A partition wall 21 extends transversely of the casing 10 within this casing and is provided with openings 22 therein through which liquid may flow. A second partition wall 23 extends within the casing 10 parallel the partition wall 21 and is connected to the partition wall 21 by means of guide sleeves 24. The guide sleeves 24 support and guide vertically extending valve rods 25 to the lower extremity of which are secured disc like resilient valve members 26. The disc-shaped valve members 26 are connected to the valve 25 by nuts 27 threaded to the threaded ends of these valve rods or by any other suitable means. These valve members 26 are of sufficient size to entirely seal the openings 22 through the partition wall 21 when the valve rods 25 are in raised position. When these valve rods 25 are slidably lowered within the guides 24, the valve members 26 move away from the partition 21 opening the apertures 22 to a desired extent. When the valve rods 25 are moved downwardly, a slight amount, a small flow of liquid flows through the openings 22, while if the valve members 26 are considerably spaced from the partition 21, a greatly increased flow of liquid is permitted to pass the valve member 26.

Packing 29 is provided within the guide sleeves 24, and packing nuts 30 are provided to effectively seal the rods 25 with respect to the sleeves 24.

Figure 1:
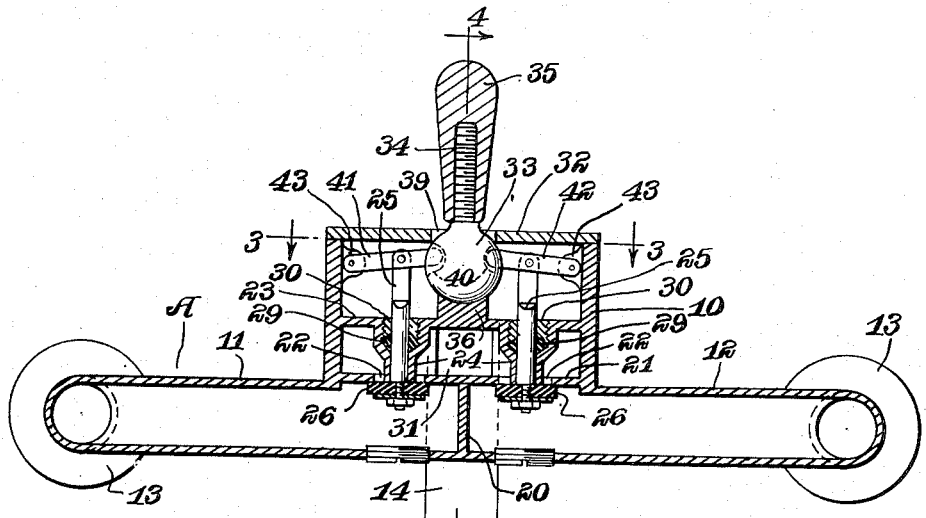
Figure 1 is a cross-sectional view through my valve illustrating the construction thereof.

The outlet pipe 14 is connected as may be seen in Figures 1, 2, and 4 of the drawings, an opening 31 being provided in the rear wall of the casing 10 to communicate with the pipe 14. The construction of this outlet passage is best illustrated in Figure 4.

Mounted between the partition wall 23 and the cover 32 of the valve A, I provide a ball 33 having a stud 34 extending therefrom. A handle 35 threadably engages the stud 34 and permits the ball 33 to be pivoted. The ball 33 may be merely frictionally engaged between the cover 32 and a boss 36 on the partition wall 23, or a spring such as 37 may be interposed between partition wall 23 and the ball 33 to urge this ball into frictional engagement with the cover 32. The cover 32 is provided with an aperture 39 therethrough to accommodate the stud 34 and handle 35, and to permit adjustment of the position of the ball 33 with respect to the cover 32. By this handle 35 the ball 33 may be adjusted in various angular positions.

A pair of pockets 40 are provided in the ball 33. These pockets 40 are not positioned on diametrically opposite portions of the ball 33, but are positioned slightly above and forward the transverse axis through the center of the ball 33. When the handle 35 is operated to rotate the ball 33 from one side to the other as indicated in Figure 2 of the drawings, one of the pockets 40 is raised while the other of these pockets is lowered. The movement of the handle 35 in the opposite direction will cause the pocket which was previously lowered to be raised, and the pocket which was previously raised to be lowered. By an examination of Figure 6 of the drawings, it will also be clear that the movement of the handle 35 to rotate the ball 33 in a forward direction will also act to lower both of the pockets 40, each pocket being moved from a position indicated by the full line showing in Figure 6 of the drawings, to the position indicated by the dotted outline in this figure.

A lever 41 is pivoted loosely to one wall of the casing 10 while a second lever 42 is pivoted loosely to the opposite wall of the casing 10. As may be seen in Figures 3 and 5 of the drawings, the levers 41 and 42 are bifurcated to engage pivotally on either side of an ear 43, one of which is mounted on either side of the casing 10. The upper extremities of the valve rods 25 are flattened as illustrated, and extend between the bifurcated ends of the levers 41 and 42, being loosely pivoted thereto at 44. Because of the fact that the levers 41 and 42 are actuated by movement of the ball 33, it is necessary that the levers 41 and 42 be pivoted with sufficient looseness to permit slight angularity of these levers to take place. The pivots 44 usually extend through a transverse slot 45 in the rods 25 as illustrated in Figure 2 of the drawings.

The levers 41 and 42 extend in the pockets 40 formed in the ball 33. The ends of the levers 41 and 42 are rounded so that they may engage freely in the pockets 40. These pockets 40 are somewhat larger than is necessary to accommodate the ends of the levers 41 and 42 so that they may assume a desired amount of angularity with respect to the ball 33 without binding on the edges of the pockets 40.

In operation it will be seen that when the valve handle 35 is in central upright position as shown in Figure 1 of the drawings, the resilient disc valve members 26 are held in closed position covering the openings 22 through the partition wall 21. The valves 26 are held in this position by the frictional engagement between the ball 33 and the cover 32 and also by the pressure of liquid within the inlet pipes 11 and 12. If the handle 35 is pivoted to the left as indicated by the full line position in Figure 2 of the drawings, the ball 33 is rotated in its position and one of the pockets 40 is lowered, while the other pocket is raised slightly. This action will cause the lever 41 to be pivoted downwardly so that the valve rod 25 pivoted thereto will be lowered as illustrated in full line in Figure 2, opening the apertures 22 adjacent the left-hand valve member 26 positioned in the inlet pipe 11. The shape of the pocket 40 is such that the lever 42 will not be pivoted upward materially, any upward motion of this rod 25 acting to compress the valve member 26 and to rotate the ball 33 forwardly slightly.

When the valve 35 is pivoted to the right into the position illustrated by the dotted outline in Figure 2 of the drawings, the ball 33 rotates acting to pivot the lever 41 upwardly into the dotted position closing the left-hand valve member 26 in the inlet pipe 11. This action also acts to pivot the lever 42 downwardly, thus lowering the valve rod 25 connected thereto and opening the valve member 26 in communication with the inlet pipe 12. Thus in the full line position illustrated in Figure 2 of the drawings, a supply of hot water will be permitted to flow through the inlet pipe 11, the openings 22 communicating therewith, the discharge opening 31, the pipe 14, and the spout 15 connected thereto. When the handle 35 is moved into the position indicated in dotted outline in Figure 2, cold water is permitted to flow through the pipe 12 and the openings 22 in communication therewith to the mixing chamber between the partition walls 21 and 23, from which chamber it is permitted to flow through the discharge opening 31 and the pipe 14, out through the spout 15.

If it is desired to obtain a mixture of hot and cold water it is only necessary to pivot the handle 35 forwardly as indicated in Figure 6 of the drawings, moving the handle from the full line position illustrated therein to the dotted position. Rotation of the ball 33 in this forward direction acts to lower both of the pockets 33 as may be seen in this view. Thus both of the levers 41 and 42 are pivoted downwardly forcing the valve rods 25 into lowered position, and disengaging the valve members 26 from closed position adjacent the partition 21. The amount of mixed hot and cold water which will flow through the valve is regulated by the distance of movement of the handle 35. If the handle 35 is pivoted only slightly the valve members 26 are moved only slightly from the partition 21, allowing only a small amount of water to flow into the mixing chamber. Further movement of the handle 35 forwardly, however, opens the valve members 26 to a greater extent, causing a greater flow of liquid therethrough.

From the foregoing description, it will be obvious that transverse movement of the handle 35 acts to proportion the amount of liquid from each inlet pipe which will be permitted to flow into the mixing chamber while forward movement of the handle 35 acts to vary the flow of liquid through both of the pipes. It will accordingly be clear that if the handle 35 is pivoted to one side slightly and pivoted forwardly slightly, both of the valves 26 will be open to some extent and one valve will be open a greater amount than the other. The same proportion of mixture may be obtained by holding the handle 35 slightly pivoted to one side, and then moving the handle forwardly. The amount of liquid flowing through the valve may be thus adjusted by forward movement while the proportion of hot and cold water may be adjusted by regulating the angularity of the handle in a transverse direction.

When the handle 35 is operated to obtain a mixture of hot and cold water, the handle may be moved transversely to provide the desired proportion of liquids and then pivoted forwardly to produce the desired flow. If it is preferred, however, the handle 35 may be pivoted forwardly to provide the desired flow of liquid, and then may be adjusted transversely to properly proportion the hot and cold water. By proper adjustment of the handle 35 any desired proportion of the two liquids may be obtained and any desired flow may also be accomplished.

While I have described the valve A as being particularly adapted for use in mixing hot and cold water, it is obvious that any two liquids or fluids may be regulated by my mixing valve to produce the desired proportion and flow. It will also be obvious that an indicator may be provided in the mixing chamber between the partitions 21 and 23 to indicate the temperature of liquid in this mixing chamber. The operation only requires the use of one hand and but a single valve must be manipulated to obtain water of the proper temperature and flow.

In accordance with the patent statutes, I have described the principles of construction and operation of my mixing valve, and while I have endeavored to set forth the best embodiment thereof, I desire to have it understood that this is only illustrative of a means of carrying out my invention, and that obvious changes may be made within the scope of the following claims without departing from the spirit of my invention.

I claim:

1. A valve comprising a casing, a pair of inlets thereto, valves in said inlets, means actuating said valves, pivoted levers for operating said valve actuating means, a ball-ended control lever, socket means in said casing, and a pivotal connection between said ball and said levers adjacent the surface of said ball for actuating said valves positively in either direction.

2. A valve comprising a casing, a pair of inlets thereto, valves in said inlets, lever means for actuating said valves, a ball-ended control lever, pockets in the ball end, said levers engaging in said pockets, and means rotatably supporting said ball-ended lever in said casing.

3. A valve comprising a casing, a pair of ports therein, valves in said ports, lever means for moving said valves, a ball-ended control lever having eccentrically positioned pockets therein engaging one end of said lever means for operating the same.

4. A valve comprising a casing, a plurality of inlets thereto, a valve in each of said inlets, lever means for actuating said valves, a ball-ended control lever, pockets in said ball end, said lever means engaging in said pockets, and means rotatably supporting said ball-ended control lever in said casing.

5. A valve comprising a casing, a plurality of inlets thereto, a valve in each of said inlets, lever means for actuating said valves, a rotatably supported ball in said casing means by which rotation of said ball may be effected, and pockets in said ball, said lever means engaging in said pockets.

6. A valve comprising a casing, a plurality of inlets thereto, a valve in each of said inlets, levers for actuating said valves, a rotatably mounted ball supported by said casing, means by which movement of said ball may be effected, pockets in said ball angularly spaced at less than one hundred and eighty degrees, the ends of said levers engaging in said pockets.

7. A valve comprising a casing, a plurality of passages therein, a valve in each said passage, a lever controlling each valve, a control ball, means by which movement of said ball may be effected, and means pivotally connecting said levers to said ball for movement in any direction thereby at points angularly spaced less than one hundred eighty degrees.

8. A valve comprising a casing, a plurality of inlets thereto, a valve in each said inlet, a lever pivotally connected to each said valve, a ball, means by which movement of said ball may be effected, and means pivotally connecting each of said levers to said ball at points spaced from a vertical plane through the center of said ball and spaced from a horizontal plane through the center of said ball, whereby said valves may be positively moved in either direction.

9. A valve comprising a casing, a plurality of inlets thereto, a valve in each said inlet, parallel valve rods secured to move with said valves, levers connected pivotally to said valve rods, a control ball, and means pivotally connecting said levers to said ball at points spaced from a plane through the center of said ball parallel to a plane through the axes of said valve rods, whereby said valves may be positively moved in either direction.

10. A valve comprising a casing, a plurality of inlets thereto, a valve in each of said inlets, lever means for actuating said valves, a control lever, pockets in said control lever, said lever means engaging in said pockets, and means universally supporting said control lever in said casing.

JAMES FREDERICK COCHRAN.